INVENTOR.
LORENZ V. KUNKEL
ATTORNEY

Oct. 22, 1968     L. V. KUNKEL     3,407,040
RECOVERY OF FREE SULFUR FROM SOUR GASES
Filed Sept. 22, 1966     2 Sheets-Sheet 2

INVENTOR.
LORENZ V. KUNKEL
BY *Arthur McIlroy*
ATTORNEY

United States Patent Office 3,407,040
Patented Oct. 22, 1968

3,407,040
RECOVERY OF FREE SULFUR FROM SOUR GASES
Lorenz V. Kunkel, Tulsa, Okla., assignor to Pan American Petroleum Corporation, Tulsa, Okla., a corporation of Delaware
Filed Sept. 22, 1966, Ser. No. 581,282
7 Claims. (Cl. 23—225)

ABSTRACT OF THE DISCLOSURE

In Claus type sulfur plants it is necessary to cool sulfur-bearing gases and then to reheat these gases above 400° F. to initiate reaction in bauxite reactors. It is proposed to oxidize a stream of hot vapor with air over bauxite catalyst at high space velocities at temperatures above 600–900° F., and to blend the effluent from the catalytic reheater with the remaining sulfur stream to raise the vapor temperature at the reactor inlet to the required temperature.

---

Figure 1:
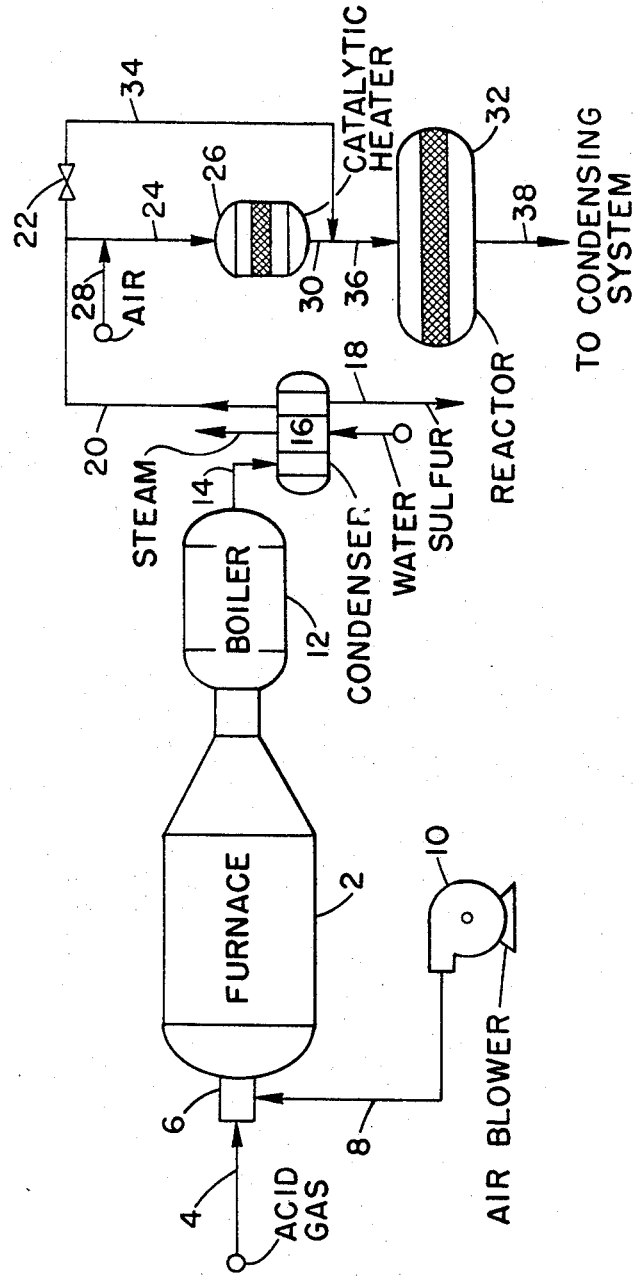

The present invention relates to the manufacture of free sulfur from gas streams containing hydrogen sulfide. More particularly it is concerned with a novel method for preheating the feed to a catalytic converter or converters in which either the direct oxidation or Claus reactions can be effected.

In the conversion of hydrogen sulfide to free sulfur there are two basic procedures that are now used commercially. The first is the Claus process which involves reaction of hydrogen sulfide with sulfur dioxide in the presence of a catalyst to form free sulfur and water, and the second is the direct oxidation process which converts hydrogen sulfide to free sulfur by reaction of the former with oxygen in specific proportions in the presence of a catalyst. The Claus process is used on acid gases containing principally $H_2S$ and $CO_2$, such as are recovered from natural gas sweetening units and refinery desulfurization units.

There are two major variations in the modern Claus process, the straight through and the split flow. In the straight through process all of the acid gas is fed to the boiler with combustion air. The boiler acts as a non-catalytic reactor converting 30–69% of the hydrogen sulfide in the feed to sulfur. The sulfur is generally condensed from the boiler effluent before the first reactor. This sulfur removed allows a lower reactor feed temperature which improves yields without incurring catalyst deactivation by sulfur condensation.

The straight through type of plant has the advantages of simplified instrumentation and high yield. However, it will not be possible to use this process if the hydrogen sulfide content of the acid gas is too low for stable combustion or if the hydrocarbon content is so high as to cause catalyst fouling and dark sulfur and to require excessive combustion air. To overcome these problems, the split flow type of plant is used.

In the split flow process, as much of the acid gas as possible without adversely affecting combustion stability is fed to the waste heat boiler with sufficient air to convert one-third of the total hydrogen sulfide fed to the plant and all hydrocarbons fed to the boiler to sulfur dioxide, carbon dioxide, and water. The excess $H_2S$ fed to the boiler prevents formation of $SO_3$ with resulting corrosion problems and allows some sulfur formation which improves yields. The remaining acid gas is blended with the boiler effluent prior to being charged to the first reactor. If very low hydrogen sulfide concentrations necessitate preheating the acid gas, the split flow process minimizes the preheat duty. The split flow process reduces combustion air requirements for plant feeds having a high light hydrocarbon content.

In the direct oxidation process, $H_2S$ in a gas stream is oxidized with air directly to sulfur over a bauxite catalyst at temperatures up to 1000° F. The reaction is highly exothermic. This process is applicable to sour natural gases as well as acid gases from hydrogen sulfide absorption units. For sour gases, the maximum economic $H_2S$ concentration is about 25 mol percent; for acid gases about 15 mol percent. The direct oxidation step, or steps, is usually followed by a conventional Claus reactor to convert most of the residual $H_2S$ and $SO_2$ to sulfur.

Briefly, I accomplish the preheating step by subjecting to direct oxidation conditions a small stream containing hydrogen sulfide in contact with a suitable catalyst such as bauxite. This hydrogen sulfide-containing stream may be derived either from the main feed stream going to the catalytic converter or it may be from a separate source. In any event the direct oxidation step is effected in a reaction zone under conditions such that the effluent therefrom is at a temperature of from about 600° to 1000° F. This effluent stream is then blended with the feed to the Claus catalytic converter, the two streams being so proportioned as to give a final mixture having a temperature of from about 425° to 450° F.

In operation of a conventional straight through Claus sulfur plant, where the hydrogen sulfide and air are fed to a furnace in amounts sufficient to convert about one-third of the hydrogen sulfide to sulfur dioxide, ordinarily about 30–69% of the recoverable sulfur is produced in the furnace. In order to efficiently convert the remaining unreacted hydrogen sulfide and sulfur dioxide to free sulfur in one or more downstream catalytic converters, the sulfur produced in the furnace should be removed before the reactants enter the converter. This is done by passing the boiler effluent through a condenser thus reducing the temperature of the uncondensed phase, for example, to about 350° F. To operate the converter at maximum efficiency, the uncondensed phase should be heated from about 425° to about 450° F. before it contacts the catalyst. In the past this reheating step has been accomplished primarily by one to two methods, i.e., extraction or bypass reheating, and direct fired or inline reheating. These procedures, however, have certain practical disadvantages. For example, in the case of bypass reheating, fluctuations in the feed gas throughput affect the volume of gas used for bypass reheating. Thus, when the plant throughput decreases, the temperature of the boiler effluent—from which the gas is derived for bypass reheating—is substantially lower. Because of this when the volume of throughput decreases, the amount of gas bypassed around the first condenser after the boiler must be increased in order to produce a final feed mixture to the first converter having a proper preheat temperature for initiating reaction of hydrogen sulfide with sulfur dioxide. This in turn results in the introduction of considerable free sulfur—present in the bypass gas—into the catalytic converter thus rendering equilibrium conditions less favorable for the transformation of the hydrogen sulfide to free sulfur. When bypass reheating is used instead of direct fired heating, the incremental sulfur contained in a reactor feed requires that the reactor temperature be raised to prevent catalyst deactivation. This increase in temperature lowers the sulfur yield in that reactor.

With a direct fired or inline heater the initial investment and installation costs are high. Because temperatures of the order of 2500° F. are produced in these heaters, they must be refractory lined and of durable construction. Even then maintenance is often a problem owing to the high temperatures. The refractory sometimes fails causing the sides of the heater to burn out resulting in expensive downtime and partial or total replacement of costly equipment. Operation of such a unit can also give rise to problems. The air-gas ratio must be properly controlled, the temperature generated by the heater depending on the plant throughput. This requires supervision and rather complicated and expensive control equipment. These problems, of course, are present in the split flow and direct oxidation processes as well as in the straight through method.

Accordingly, it is an object of my invention to provide a means for preheating the feed to a Claus converted that will avoid the above-mentioned difficulties characteristic of bypass and inline or direct fired reheaters. It is a further object of my invention to provide the necessary preheat of the hydrogen sulfide-sulfur dioxide feed to a Claus catalytic converter by diverting a portion of the boiler effluent—after at least some of the free sulfur therein has been removed—together with a small amount of oxygen into a direct oxidation reactor and using the hot effluent therefrom to preheat the remainder of the boiler effluent from which most or all of the free sulfur has been removed to a temperature of from about 425° to about 450° F. before introduction of the latter into said converter. It is another object of my invention to employ a small direct oxidation reactor as a source of heat for preheating feed streams for both split flow and direct oxidation plants. It is still another object of my invention to employ the effluent from a direct oxidation sulfur recovery unit as preheat where bypass reheat is normally used. Thus, as mentioned above, it often happens that the volume of feed to a sulfur recovery plant fluctuates rather widely and when the volume thereof decreases, substantially larger volumes of bypass gas must be used to reach the required preheat temperature. By using my invention the volume of bypass gas can remain substantially constant; all or a portion of it—together with the desired amount of air—can be diverted through the direct oxygen catalytic reactor and the effluent therefrom then either combined with the steam of cooled gas from the first condenser to which the remainder of the bypass gas has been added, or said effluent can be combined with the bypass gas and the resulting mixture then blended with said cooler gas to produce a reaction mixture having a preheat temperature suitable for introduction into the first Claus converter.

In the drawings, FIGURE 1 is a flow diagram of one embodiment of my invention wherein the entire boiler effluent passes through a first condenser after which a portion of the cooled gas is diverted to the direct oxidation reactor and the resulting hot effluent used for preheat purposes.

Figure 2:
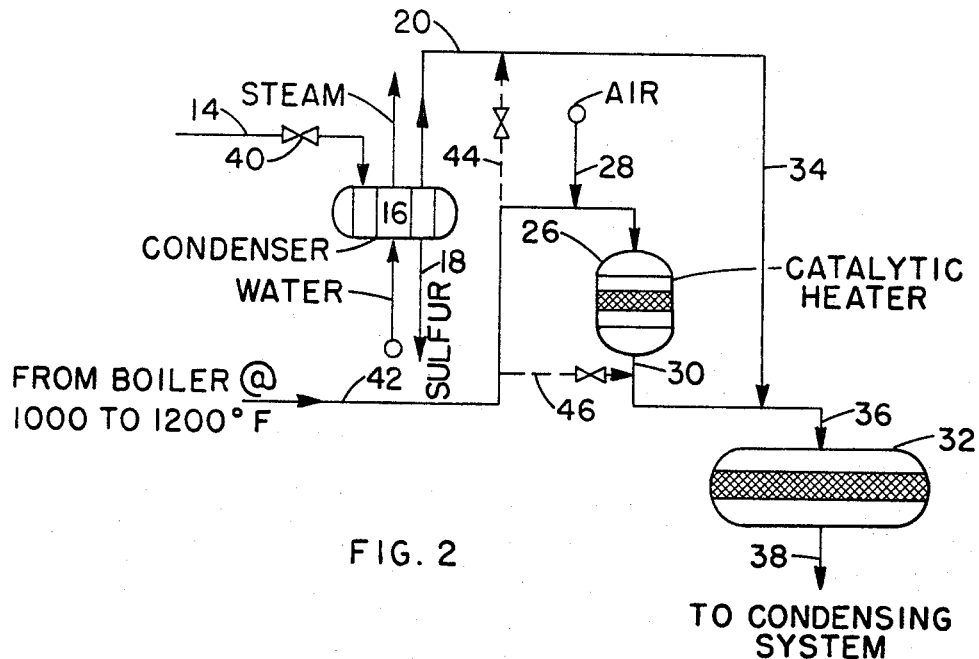

FIGURE 2 illustrates that portion of the plant downstream for the boiler wherein a combination of bypass reheating and catalytic reheating is used to preheat the feed to a Claus converter.

Figure 3:
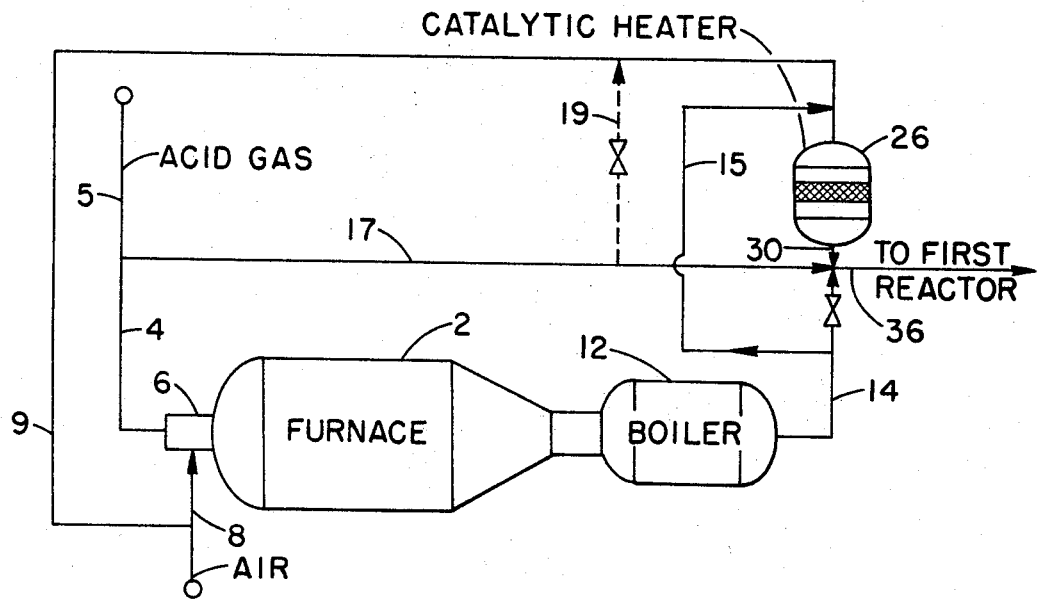

Still another application of my invention is represented in FIGURE 3 showing the front end of a split flow type of sulfur recovery unit.

My invention will be further illustrated by reference to FIGURE 1 wherein an acid gas feed such as that taken from a conventional gas sweetening system is introduced into furnace 2 via line 4 and burner 6. Stoichiometric air—less the amount required for operation of the catalytic reheater, as will be explained later—is added to the furnace through line 8 by means of blower 10. In the furnace a portion of the hydrogen sulfide is converted to sulfur dioxide at a temperature in the neighborhood of 2500° F. Also, some of the sulfur dioxide thus produced reacts with the hydrogen sulfide to form free sulfur. The quantity of sulfur thus produced oftentimes represents from about 40 to 60% of the total recoverable sulfur. Gases containing hydrogen sulfide, sulfur dioxide and free sulfur are discharged from furnace 2 into boiler 12, cooled to about 500° F. to 600° F. and conducted therefrom through line 14 into condenser 16 where the sulfur produced in the furnace is converted into a liquid and removed through line 18. The uncondensed phase, which is at a temperature of, for example, about 350° F. to 375° F., is taken off the top of condenser 16 through line 20 having a throttle valve 22 which serves to divert a portion, e.g., 10 to 25% of the stream in line 20 to line 24 leading to catalytic heater (reactor) 26. The cooled gas in line 24 is mixed with from about 2% to 5%, typically about 3.5% of the total air introduced into the plant, and the resulting mixture fed to heater 26. Depending of course on the amount of air fed to heater 26 via line 28, the temperature of the effluent in line 30 may vary from about 600° F. to about 1200° F. Air flow to the catalytic heater can be regulated by a simple temperature control (not shown). Uusually the hydrogen sulfide-containing stream flowing into heater 26 represents about 20% of the feed to reactor 32 thus providing a sufficient excess of hydrogen sulfide to prevent formation of sulfur trioxide.

Ordinarily in converting hydrogen sulfide to free sulfur by means of direct oxidation—the reaction occurring in heater 26—space velocities of from about 2 to 15 lb. mols of feed gas per cubic foot of catalyst are employed. However, the space velocities employed at this point of my process may be much higher, e.g., 100 to 200 lb. mols of feed gas per cubic foot of catalyst. In this connection it should be mentioned that the catalyst in heater 26 is preferably in the form of a relatively thin bed, i.e., about 4 to 8 inches, to avoid excessive pressure drop. At the higher space velocities the possibility of unreacted oxygen passing through the heater can be minimized by holding the effluent temperature in line 30 to about 1200° F. Actually some oxygen can be tolerated if catalyst reactor 32 inlet temperature were lowered slightly, e.g., about 20° F. to compensate. For example, if only 90% of the air to heater 26 is converted and 10% passes through to reactor 32 the resulting temperature rise due to the presence of the free oxygen is less than 10° F. Cooled gas in line 34 is blended with the hot effluent in line 30 so as to produce feed gas mixture in line 36 having a temperature of from about 425° to about 450° F. After conversion of the hydrogen sulfide and sulfur dioxide in reactor 32 product sulfur in vapor form at a temperature of about 575° to 675° F., together with water vapor and unconverted hydrogen sulfide and sulfur dioxide are withdrawn through line 38 and the sulfur recovered therefrom by any of several known methods. Depending on the concentration of hydrogen sulfide and sulfur dioxide in line 38 an additional Claus reactor may be employed after bringing the reactants to the desired preheat temperature in accordance with the process of the present invention.

As previously mentioned one of the difficulties with a plant using bypass reheating resides in the fact that such method is sensitive to variations in plant throughput volumes. If the throughput goes down, the amount of bypassed gas must be increased in order to raise the temperature of the reaction mixture going to the converter to the desired level. Ordinarily this causes a reduction in percentage of sulfur recovery. However, by raising the temperature of the reheat gas catalytically as provided by my invention it is possible to obtain sulfur recoveries at low throughput equal to those secured at high throughput rates in plants where bypass or extraction reheating is used.

FIGURE 2 illustrates an adaptation of my invention to a plant employing bypass reheating. Thus a major part of boiler effluent in line 14, controlled by throttle valve 40, flows into condenser 16 from which at least some of the product sulfur is removed by means of line 18. The remainder of said effluent, typically about 20% is taken through line 42 and mixed with enough air in line 28 to generate a temperature in catalyst heater 26 of from about 600° to about 1200° F. The resulting hot effluent is then mixed with cooler gas taken from the top of condenser 16 via lines 20 and 34 to produce a preheated feed in line 36 having a temperature of from 425° to 450° F. which is then introduced into Claus reactor 32 and product gases at about 550° to 575° F. removed therefrom through line 38.

Alternatively, larger volumes of gas may be taken from line 14, sent through line 42 and portions thereof blended with gas in line 34 via valved dotted line 44 and/or mixed with hot gas in line 30 by means of transfer through dotted valved line 46. Diversion of hot gas into the system through lines 44 and 46 generally would only be done where the throughput to the plant was materially decreased, e.g., 40 to 50% of capacity, and the heat output from heater 26 was limited.

FIGURE 3 illustrates an application of my invention as applied to the split flow process wherein approximately 40% of the acid ($H_2S$-containing gas) in line 5 is diverted to line 4, and sent to furnace 2 via burner 6. The amount of air added through line 8 is only enough to react with not more than about 80% of the hydrogen sulfide flowing to the furnace. Stated otherwise, the volume of air introduced into furnace 2 via burner 6 corresponds to the amount required to convert approximately one-third of the total acid gas in line 5 to $SO_2$. Under these conditions the effluent from furnace 2 which is cooled to about 500° or 600° F. in boiler 12 contains some hydrogen sulfide in addition to sulfur dioxide. A portion of this cooled effluent, e.g., 50%, is taken from valved line 14 and diverted into line 15 where it is combined with from about 2 to 5% of the total plant air (line 9) and the resulting mixture fed to the direct oxidation reactor (heater) 26.

The amount of hydrogen sulfide fed directly to the furnace may vary rather widely and will depend to some extent on the desired temperature of the effluent from catalytic heater 26. Regardless of the volume of hydrogen sulfide added to furnace 2 (this amount should be at least one-third of the total hydrogen sulfide fed to the plant) the air employed at that stage of the process should not be more than enough to convert about one-third of the total hydrogen-sulfide supply to sulfur dioxide. If desired, the valve in line 14 may be placed in a fully open position and about 10 to 20% of the hydrogen sulfide in line 17 diverted through dotted valved line 19, combined with the air in line 9, the resulting mixture preheated to about 450 to 500° F. and thereafter fed to heater 26. The effluent from heater 26 is withdrawn through line 30 at a temperature ranging from about 600° to about 1200° F. and thereafter blended with the cold feed in line 17 to produce a reaction mixture having a temperature of from about 425 to 450° F. which is transferred through line 36 to a conventional reactor not shown.

It will be apparent that the proportions of air and hydrogen sulfide-containing gas fed to heater 26 will depend on the temperature increase desired and the ultimate volume of feed to the reactor that is to be heated to such temperature. The required conditions to accomplish this can be readily determined by experiment.

From the foregoing description it will be apparent that I have developed a method for preheating hydrogen sulfide—and sulfur dioxide and hydrogen sulfide—air reaction mixtures which will give higher recoveries than can be obtained in bypass reheat plants. Also, the use of a catalytic heater, as taught herein, results in low investment and fewer operating problems than are encountered in direct fired reheater plants.

I claim:
1. A method for the conversion of hydrogen sulfide into elemental sulfur wherein said hydrogen sulfide is partially burned with air in a non-catalytic zone to produce a mixture containing hydrogen sulfide, sulfur dioxide and free sulfur and wherein at least a major portion of said mixture is cooled to a temperature low enough to result in the removal of liquid sulfur from the uncondensed components, the improvement which comprises diverting a minor portion of said uncondensed components containing hydrogen sulfide and sulfur dioxide, blending said minor portion with air, subjecting the mixture thus formed to direct oxidation conditions in a catalytic reaction zone, withdrawing the hot products from said reaction zone, and thereafter adding a sufficient volume of said hot products to the major portion of said uncondensed components to adjust the temperature of the resulting mixture to a proper preheat level for initiating a catalytic reaction of hydrogen sulfide with sulfur dioxide, and thereafter contacting said resulting mixture with a catalyst for said reaction in a separate reaction zone to produce elemental sulfur.

2. The method of claim 1 wherein the amount of air blended with said minor portion corresponds to from about 2 to about 5% of the total air employed.

3. The method of claim 1 wherein the amount of air blended with said minor portion corresponds to a quantity sufficient to raise the temperature of said hot reaction products to a level of from about 600° to about 1200° F.

4. The method of claim 3 wherein said minor portion corresponds to about 10 to 25% of the total uncondensed components stream.

5. The method of claim 1 wherein the air blended with said minor portion corresponds to about 3.5% of the total air employed and said minor portion corresponds to about 20% of the total uncondensed components stream.

6. The method of claim 4 wherein all of the mixture of hydrogen sulfide, sulfur dioxide and free sulfur from said non-catalytic zone is passed through a condenser under temperature conditions sufficient to remove sulfur therefrom in liquid form.

7. In a method for the recovery of free sulfur from a gas containing hydrogen sulfide by means of any of the conventional catalytic methods, the improvement which comprises subjecting a minor amount but at least about 5 to 10% of the total hydrogen sulfide to direct oxidation in a catalytic reaction zone, said minor amount being admixed with from about 2 to about 5% of the total air employed, whereby the effluent from said zone reaches a temperature of from about 600° to about 1200° F., blending a sufficient volume of said effluent with a reaction mixture for any of said catalytic methods to preheat said reaction mixture to a temperature of from about 400° to about 450° F., said reaction mixture containing the remainder or major portion of said gas, thereafter effecting conversion in a known manner of the hydrogen sulfide in said reaction mixture to free sulfur in a separate catalytic reaction zone, withdrawing the reaction product from the latter, and recovering free sulfur therefrom.

References Cited
UNITED STATES PATENTS

| | | | |
|---|---|---|---|
| 2,148,258 | 2/1939 | Carter | 23—226 |
| 2,208,247 | 7/1940 | Carter | 23—226 |
| 2,630,374 | 3/1953 | Miller | 23—225 |
| 2,919,976 | 1/1960 | Feagan | 23—225 |
| 3,297,409 | 1/1967 | Kunkel et al. | 23—225 |

OSCAR R. VERTIZ, *Primary Examiner.*

G. PETERS, *Assistant Examiner.*